United States Patent
Oberthür

[15] 3,682,514
[45] Aug. 8, 1972

[54] ANTISKID BRAKE CONTROL SYSTEM

[72] Inventor: Heinrich Oberthür, Offenbach-Rumpenheim, Germany

[73] Assignee: ITT Industries, Inc., New York, N.Y.

[22] Filed: Aug. 4, 1970

[21] Appl. No.: 60,445

[30] Foreign Application Priority Data

Aug. 7, 1969 Germany..........P 19 40 247.2
Aug. 7, 1969 Germany..........P 19 40 246.1

[52] U.S. Cl......................303/21 F, 303/10, 303/61
[51] Int. Cl................................................B60t 8/02
[58] Field of Search...188/181; 303/6, 10, 21, 61–63, 303/68–69

[56] References Cited

UNITED STATES PATENTS

| | | | |
|---|---|---|---|
| 3,514,161 | 5/1970 | Frayer | 303/21 F |
| 3,554,612 | 1/1971 | Harned | 303/21 F UX |
| 3,556,609 | 1/1971 | MacDuff | 303/21 F |
| 3,532,391 | 10/1970 | Klein | 303/21 F |
| 3,545,817 | 12/1970 | Yarber | 303/21 BE UX |
| 3,574,416 | 4/1971 | Skoyles | 303/21 F |

FOREIGN PATENTS OR APPLICATIONS 1,243,526  6/1967  Germany..................303/21 F

*Primary Examiner*—Milton Buchler
*Assistant Examiner*—Stephen G. Kunin
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

An antiskid brake control system having a hydraulically interconnected separating valve and pressure relief mechanism. The pressure relief mechanism includes a piston for overcoming a preloading spring in response to a hydraulic deceleration signal and at least one piston which is movable to relieve the brake pressure in the brake line. The separating valve assembly, which is actuated in response to the same deceleration signal as the pressure relief mechanism, isolates the brake line in response to the hydraulic deceleration signal and includes two valve bodies which are mechanically separated and which are both pressure-balanced during the rest position of the separating valve assembly. The valves are designed so that when the hydraulic deceleration signal is released the separating valve assembly will open even though the master cylinder pressure remains high.

25 Claims, 3 Drawing Figures

Inventor
HEINRICH OBERTHÜR

ANTISKID BRAKE CONTROL SYSTEM

BACKGROUND OF THE INVENTION

This invention relates to antiskid brake control systems for vehicles and particularly to systems of this type in which the hydraulic line to the brake is cut off or isolated from the pressure source and the volume of the line increased to relieve the brake pressure in response to an antiskid brake pressure release signal.

Antiskid brake systems for automotive vehicles usually include some means for sensing an incipient skid condition and for releasing the brake pressure in response to this signal. As the wheel speeds up the incipient skid condition is relieved, the brakes are reapplied and the cycle repeats itself to provide a rapid "pumping" of the brakes.

The parameter used to indicate an incipient skid condition may be deceleration of the wheel. When the deceleration signal exceeds a predetermined threshold value a valve separates the wheel cylinder from the master cylinder to prevent an increase in brake pressure. In addition, a relief plunger or piston is moved to increase the volume of the brake line thereby reducing the brake pressure at the wheel. Usually the relief piston is moved by the application of a constant pressure difference and the relief piston moves from one position into a second position in which the brakes are released. Since the relief piston is moved by a constant pressure difference which is independent of the prevailing brake pressures, and is moved between two finite positions, the resulting displacement of the relief piston is always the same. Since the movement of the relief piston must be sufficient to relieve the pressure under the worse conditions, the movement is often more than necessary to relieve the brake pressure and an underpressure or vacuum may result in the brake line causing the brake fluid to foam when the applied brake pressure is low. The foaming or vaporization of the hydraulic brake fluid is extremely undesirable and may cause the complete loss of the brake pressure. This problem with foaming is likely to occur when the control system is tested before starting the car. In this test, which may occur automatically as part of the ignition, the relief piston is actuated when the brakes are not being applied. The volume increase caused in the brake lines when this occurs may result in foaming of the hydraulic brake fluid.

An additional problem with systems of this type is that the high preloading of the return spring causes a rapid and noisy return of the relief piston resulting in excessive wear on the parts and objectionable noise levels.

In these systems the cut-off valve and the relief piston are often mechanically coupled so that the relief piston, which is moved by the control pressure difference, sucks the hydraulic brake fluid from the master cylinder through the separating valve which closes simultaneously. When the relief piston moves back this increase in fluid results in a pressure peak in the brake line so that the brakes are suddenly reapplied causing the deceleration threshold to be reached almost immediately after the brakes are reapplied.

SUMMARY OF THE INVENTION

It is an object of the present invention to provide an antiskid brake control system in which the separating valve and the relief piston are mechanically separate and actuated hydraulically.

It is a further object of this invention to provide a relief piston which will move only as far as is necessary to relieve the brake pressure.

This invention achieves these objects by providing a hydraulically interconnected separating valve and pressure relief mechanism. The pressure relief mechanism includes a piston for overcoming a preloading spring in response to a hydraulic deceleration signal and at least one piston which is movable to relieve the brake pressure in the brake line. The relief piston moves only as far as is necessary to relieve the brake pressure. The separating valve assembly, which is actuated in response to the same deceleration signal as the pressure relief mechanism, isolates the brake line in response to the hydraulic deceleration signal. The separating valve assembly includes two valve bodies which are mechanically separated and which are both pressure balanced during the rest position of the separating valve assembly. The valves are designed so that when the hydraulic deceleration signal is released the separating valve assembly will open even though the master cylinder pressure is still high.

DESCRIPTION OF THE PREFERRED EMBODIMENT

Figure 1:
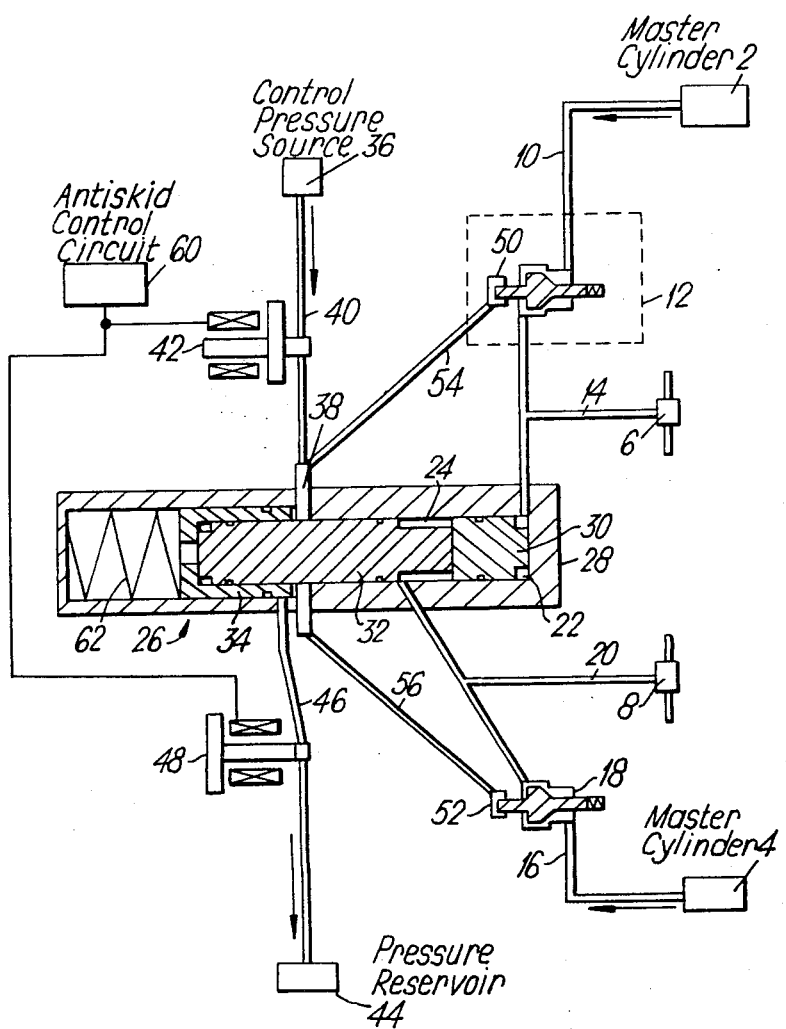
FIG. 1 is a schematic view of an antiskid brake control system embodying the present invention.

Referring to FIG. 1 there is shown schematically a dual brake circuit for one wheel of a vehicle. The dual master cylinders 2 and 4 normally are connected to the wheel cylinders 6 and 8 for one wheel of the vehicle via brake lines. The master cylinder 2 is connected to the wheel cylinder 6 via line 10, normally opened separating valve 12 and the line 14, while the master cylinder 4 is connected to the wheel cylinder 8 via the hydraulic line 16, normally opened separating valve 18, and the hydraulic line 20. The brake lines 14 and 20 are connected to the chambers 22 and 24, respectively of the pressure relief mechanism 26. The pressure relief mechanism includes a housing 28, a relief piston 30 for increasing the volume of the chamber 22 when the relief piston moves to the left, as shown in the drawing, a second relief piston 32 for increasing the volume of the chamber 24 when the relief piston 32 moves to the left, as shown in the Figure, and a spring loaded piston 34 for normally holding the pistons 32 and 30 in the position shown, in which the volume chambers 22 and 24 are at a minimum. A source of control pressure 36 may be connected to an annular chamber 38 via line 40 and the normally closed solenoid valve 42 A pressure reservoir 44 is normally connected to the annular chamber 38 via line 46 and the normally opened solenoid valve 48. The chamber 38 is connected to the actuating chambers 50 and 52, respectively, of the separating valves 12 and 18 via the hydraulic lines 54 and 56, respectively.

During normal actuation of the brakes the brake pressure from the master cylinders is directly applied to the wheel cylinders. When a deceleration signal is received from the antiskid control circuit, generally indicated by numeral 60, solenoid valve 42 is opened and solenoid valve 48 is simultaneously closed. The hydraulic fluid from the control source 36 is applied to the chamber 38 and the actuating chambers 50 and 52 of the separating valves. The separating valves close cutting off the supply of pressure to the wheel cylinder while the piston 34 moves against the spring 62 allowing the pistons 30 and 32 to increase the volume of the brake lines 20 and 14 to relieve the brake pressure at the wheels. When the pressure is relieved the wheels speed up and the deceleration signal disappears causing the solenoid valve 42 to return to its normally closed position and the solenoid valve 48 to its normally opened position. This allows the system to return to its initial condition, thus completing a control cycle.

DESCRIPTION OF THE SEPARATING VALVE

Figure 2:
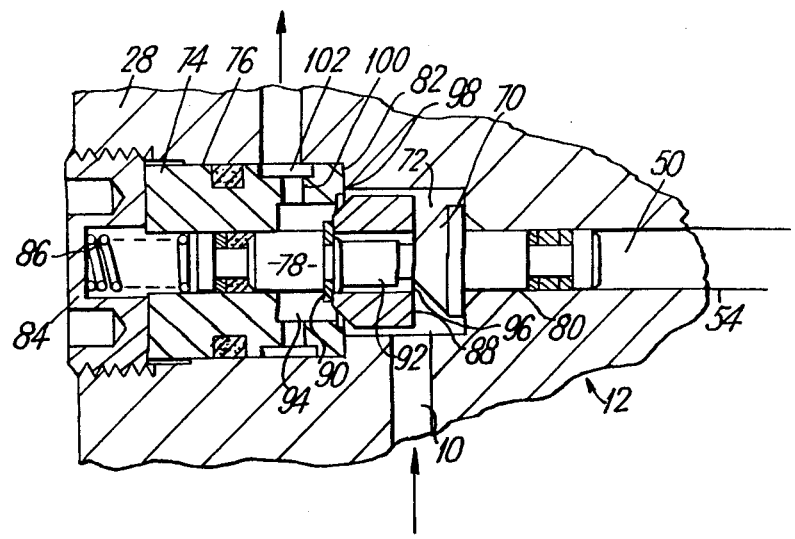
FIG. 2 is an enlarged sectional view showing the separating valve assembly shown in FIG. 1.

Now having described in general terms the operation of the antiskid system reference is made to FIG. 2 for a description of the separating valve assembly 12. Since the separating valves 12 and 18 are identical in construction and operation, it will be necessary to describe only one of these valves in detail.

The separating valve 12 is mounted in the housing 28 which also includes the pressure relief mechanism 26. A first movable valve member 70 is slidable in an axial direction within the chamber 72. A fixed sleeve 74 in the stepped bore 76 supports and guides one end of the rod 78 which is an integral part of the movable valve member 70. The other end of the rod is supported and guided in the bore 80. The sleeve is held against the abutment 82 by means of a cap 84. A spring 86 acting between the cap and the left end of the rod 78 biases the valve member 70 towards the open position against the abutment 82 at the bottom of the stepped bore 76. A second valve member 88 is axially movable on the rod 78 between an abutment 90 and the conical closing surface of the valve member 70. Axial slots or passages 92 in the valve body 88 connect the chamber 94 formed between the sleeve 74 and the rod 78 with the chamber 72 when the valve body 70 is opened and not in contact with the seat 96 on the valve member 88. The end of the valve member 88, remote from the seat, has an annular frusto-conical closing surface which cooperates with a seat 98 on the sleeve to provide the second valve. The chamber 94 is connected to the brake line 14 leading to the wheel 6 via the radial bore 100 in the sleeve and an annular chamber 102. The chamber 72 is connected to the hydraulic line 10 from the master cylinder 2. The right-hand end of the rod 78, as seen in FIG. 2, forms a piston surface in the actuating chamber 50 which is connected to the control chamber 38 of the pressure relief mechanism via the line 54.

DESCRIPTION OF THE PRESSURE RELIEF MECHANISM

Figure 3:
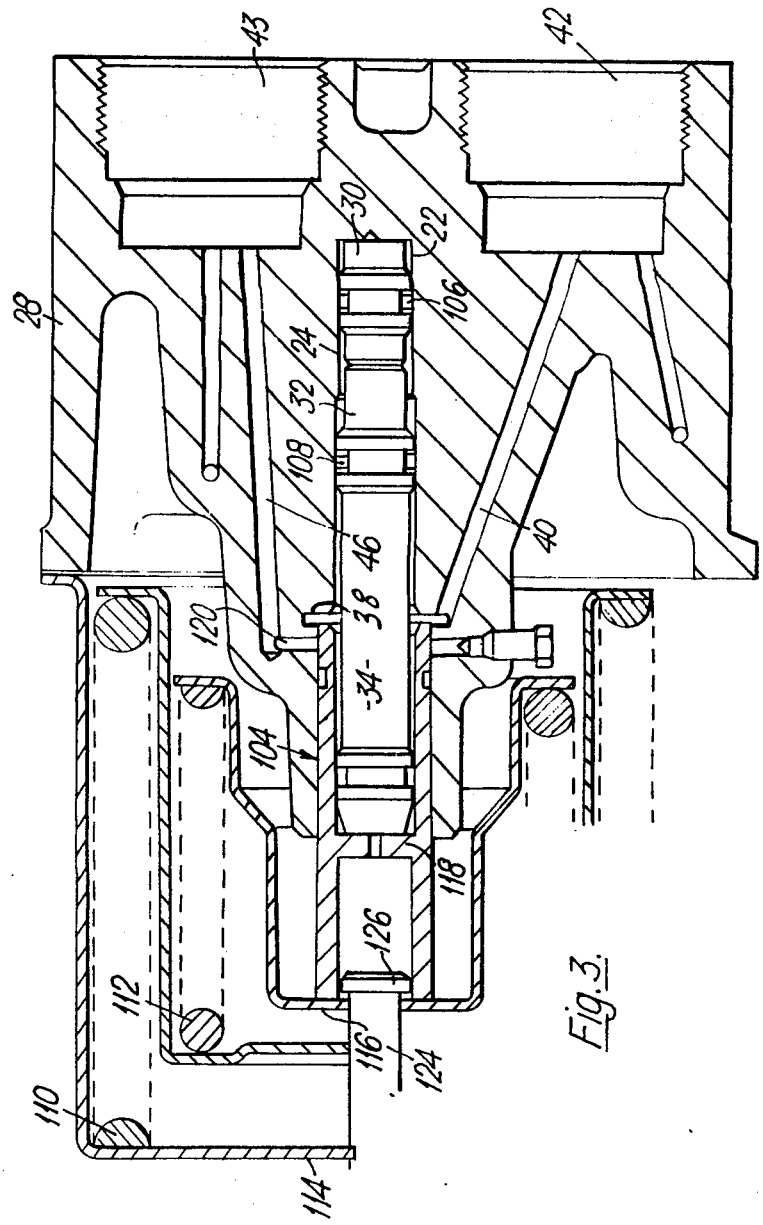
FIG. 3 is an enlarged sectional view of the pressure relief mechanism shown in FIG. 1.

The following description of the pressure relief mechanism 26 should be read in conjunction with FIG. 3 of the drawings. Although the pressure relief mechanism shown in the drawing has two pressure relief pistons 30 and 32, one for each of the brake circuits, it could be constructed with a single pressure relief piston for use in systems in which there is only one wheel cylinder for each wheel brake.

The pressure relief mechanism 26 is located in the same housing 28 as the separating valve 12. A longitudinal bore in the housing 28 provides a stepped cylinder chamber 104. The pressure relief piston 30 is positioned in the bottom of the bore and forms the annular chamber 22 between a reduced portion of the piston and the cylinder wall. The chamber 22 is connected to the wheel brake line 14, not shown. A second pressure relief piston 32 is fitted behind the piston 30 and forms a second annular chamber 24 which is connected to the second wheel brake line 20. Seals 106 and 108 on the pistons 30 and 32, respectively, isolate these chambers. A third annular chamber between the piston 32 and the cylinder wall is connected to the annular pressure chamber 38 which is formed at the step in the cylinder 104. Line 40 connects the chamber 38 to the normally closed solenoid valve 42 leading to the control pressure source 36. A sleeve piston 34 fits between the end of the piston 32 and the cylinder 104. The sleeve piston 34 is biased toward the right by the heavy return springs 110 and 112 which are serially connected between the spring retainer 114 attached to the housing and the spring retainer 116 which bears against the end of the sleeve piston 34. A partition 118 in the sleeve piston forms an abutment which limits the movement of the sleeve piston 34 to the right. In the rest position shown in the drawing the abutment forces the piston 30 and 32 against the base of the cylinder 104. A radial passage 120 breaks into the wall of the cylinder 104 along the sleeve 34. This passage is connected to the reservoir 44, not shown in FIG. 3, via the normally opened solenoid valve 48 and passage 46. The positioning of the radial passage 120 along the sleeve provides a throttle passageway between the line 46 and the annular pressure chamber 38.

To assist in assembling the pressure relief mechanism a fixed pin 124 attached to the spring retainer 114 keeps the springs under tension during assembly and limits the movement of the spring retainer 116 by means of the enlarged pin head 126. In the assembled condition the spring retainer 116 abuts against the sleeve piston 34 which in turn abuts against the pistons 30 and 32 bottoms in the cylinder 104 so that there is always a clearance between the head of the pin 126 and the spring retainer 116. In the rest position of the system the master cylinders 2 and 4 communicate with the wheel cylinders 6 and 8, respectively. The separating valves 12 and 18 are in the open position shown in FIG. 2. The valve member 70 is firmly held against its abutment by the spring 86 acting on the end of the rod 78. The valve member 88 is pressure balanced and rests against the abutment 90 on the rod 78. In this position there is a free passage between the chamber 72 connected to the master cylinder and the chamber 94 connected to the wheel cylinder line.

The valve members are pressure balanced in this position and there is no tendency for the valve to close as the master cylinder pressure increases. When the wheel deceleration due to braking exceeds the threshold value of the control 60 a deceleration signal is supplied to the solenoid valves 42 and 48. The valve 48 closes, cutting off the connection between chamber 38 and the reservoir and the valve 42 opens, allowing the control pressure from the source 36, which may be a pressure accumulator, to be supplied to the chamber 38 of the pressure relief mechanism. Since the chamber 38 is connected to the pressure actuating chamber 50 of the separating valve via the line 54, the control pressure will act on the right-hand face of the rod 78 to move the rod and valve body 70 against the spring 86. As the valve body 70 moves to the left it contacts the seat 96 on the valve member 88 and carries the valve member 88 to the right until the member 88 abuts against the valve seat 98. This closes the radially inner and outer passages of the chamber 94 and the chamber 72 and cuts off the wheel cylinder from the master cylinder.

At the same time the pressure build-up in the chamber 38 of the pressure relief mechanism causes the sleeve piston 34 to move to the left against the springs 110 and 112. As will be described hereinbelow this allows the pistons 30 and 32 to move to the left increasing the volume of the brake lines and allowing the pressure to be released.

When the pressure is released the wheel will accelerate until the deceleration signal disappears whereupon the solenoids 42 and 48 will return to their initial positions. The pressure acting on the piston end of the rod 78 is relieved and the spring 86 returns the separating valve to its initial position reconnecting the master cylinder to the wheel cylinder. At the same time the reduction in pressure in chamber 38 allows the springs 110 and 112 to force the sleeve piston 34 to the right thereby reducing the volume of the chambers 24 and 22 which effectively reduces the volume of the brake lines 14 and 20.

When the vehicle is operating under conditions where the frictional value on different parts of the road varies, such as when there are sections of the road covered with oil, it is possible that the antiskid system will operate when the frictional value between the tire and the road is low and the brake pressure is relatively low. If the vehicle moves to a part of the road with a higher frictional value the construction of this invention allows the separating valve to open even though the master cylinder pressure is increasing. In the conventional system the separating valve would remain closed until the master cylinder pressure is reduced since once the valve is closed the master cylinder pressure normally tends to hold the separating valve in the closed position. Due to the fact that the valve members 70 and 88 are pressure balanced in a closed position, it is possible for the spring 86 to open the valve 88 when the pressure in the actuating chamber 50 is reduced regardless of how high the master cylinder pressure in chamber 72 may be.

Since the separating valve and pressure relief mechanism are mechanically separated with their interdependence of movement being provided by the common pressure control, the hydraulic fluid can no longer be sucked from the master cylinder when the volume is increased by the movement of the pressure relief mechanism. The separating valve opens even if there is a pressure difference in the brake circuit after the termination of the control cycle.

Now that the operation of the separating valve has been described in detail, reference is made to FIG. 3 for a detailed description of the operation of the pressure relief mechanism 26.

Under normal conditions in the antiskid system when there is no antiskid actuation signal the pressure relief mechanism 26 is in the position shown in FIG. 3 with the volume of the chambers 22 and 24 being as small as possible. Any increase in the brake pressure which is transmitted to the chambers 22 and 24 is insufficient to overcome the heavy preload of the springs 110 and 112 acting through the sleeve piston 34. When the deceleration signal opens the solenoid valve 42 and closes the solenoid valve 48, the increase in the pressure in annular chamber 38 acts against one end of the sleeve piston 34 to move the piston toward the left against the force of the compression springs 110 and 112. The movement of the sleeve to the left opens the radial bore 120 which will provide a throttling effect described below.

When the piston sleeve 34 moves to the left the force holding the pistons 30 and 32 against the bottom of the cylinder is released and the pressure in chambers 22 and 24 moves the pistons 30 and 32 to the left an amount which is sufficient to increase the volume of the brake lines, which are now separated from the master cylinder, until the brake pressure is released. Although the force of the springs 110 and 112 is completely overcome by the movement of the sleeve piston, the pistons 32 and 30 move only an amount necessary to relieve the brake pressure. These pistons will not move far enough to cause a vacuum or underpressure in the brake lines thereby preventing foaming of the hydraulic brake fluid.

When the brake pressure is released the wheel regains speed and the deceleration signal disappears allowing the solenoid valves to resume their initial positions. The pressure chamber 38 is connected to the reservoir 44 via the cross bore 120 and the line 46. As the springs move the sleeve piston to the right the sleeve covers the cross bore 120, thus throttling the flow of hydraulic fluid from the chamber 38. In this manner dampening of the return movement of the sleeve piston is achieved thus avoiding a sudden increase in the brake pressure as the volume of the brake lines is reduced due to the movement of the pistons 30 and 32 toward the right.

Since the sleeve piston 34 can move independently of the pistons 30 and 32, the antiskid system can be tested when the brakes are not applied without causing under-pressure in the brake lines. The movement of the sleeve piston 34 will not cause any movement of the pistons 30 and 32 when there is no pressure in the brake lines. This eliminates the possibility of creating a vacuum and causing foaming of the hydraulic brake fluid.

While I have described above the principles of my invention in connection with specific apparatus it is to be clearly understood that this description is made only by way of example and not as a limitation to the scope of my invention as set forth in the accompanying claims.

I claim as my invention:

1. An antiskid brake control system for a hydraulically actuated wheel brake having a hydraulic conduit connecting a hydraulic brake bias, to the wheel brake, the antiskid system comprising; normally opened valve means in the conduit, said valve means being movable to a closed position to isolate the wheel brake in response to a hydraulic pressure signal, a storage cylinder having one end connected to the conduit between the valve and the brake, the storage cylinder having a piston therein for varying the volume of the conduit between the valve means and the brake, a spring biasing the piston toward the end of the cylinder connected to the conduit, means responsive to said hydraulic pressure signal for counteracting the spring bias, and means for generating said hydraulic pressure signal in response to an incipient skid condition of the wheel.

2. The antiskid brake control system of claim 1 wherein the means for counteracting the spring bias comprise a second piston in the cylinder between the spring and the first piston, said second piston normally transmitting the spring force to the first piston, and means for applying said hydraulic pressure signal to said second piston to move the second piston in a direction to counteract the spring force.

3. The antiskid brake control system of claim 2 wherein the second piston is a sleeve piston fitted between the first piston and an enlarged end of the storage cylinder, the sleeve having a radial flange at one end which is fitted between the spring and the first piston, and an annular pressure chamber at the other side of the sleeve piston for moving the sleeve piston and spring away from the first piston in response to said hydraulic pressure signal applied to the chamber.

4. The antiskid brake control system of claim 1 wherein said valve means comprises two valve bodies both being movable to a closed position in which each closes one of two passages forming the conduit; the first valve body being movable in response to said hydraulic pressure signal to close one passage and then move the second valve body to close the second passage.

5. An antiskid brake control system in which the pressure medium is pressurized and relieved in the section of the brake line communicating with the wheel cylinder by the controlled movement of a plunger in dependence on a controlled hydraulic pressure signal indicative of an incipient skid which is determinable by a sensor, the control system being characterized by an at least bipartite embodiment of the plunger which is sealingly guided in the cylinder chamber, the two parts of said plunger being in one direction axially displaceable with respect to each other against a retracting force, and by dividing the cylinder chamber into at least two annular chambers sealed against each other; each of the annular chambers being limited in the direction of the plunger movement by the effective surface of one of the plunger parts; the annular chamber containing the effective surface of the independently displaceable plunger part being connected with either the return line or a hydraulic accumulator via solenoid valves while the chamber containing the effective surface of the plunger part which moves only with the independently displaceable plunger part communicates with the section of the brake circuit which is to be separated from the master cylinder by a separating valve while remaining permanently connected with the wheel cylinder.

6. An antiskid brake control system as defined in claim 5, characterized in that the independently displaceable plunger part is designed as a sleeve with a partition which in rest position of the system bears against the plunger part.

7. An antiskid brake control system as defined in claim 6, characterized in that in the particular case of a two-circuit brake system the plunger part moving only jointly with the sleeve is divided into a plunger part and a floating plunger, each of them being sealed against the cylinder wall and surrounded by an annular chamber at the ends facing the cylinder bottom and each annular chamber communicating with one of the two brake circuits.

8. An antiskid brake control system as defined in claim 7, characterized in that the annular chamber surrounding the end of the floating plunger which rests on the cylinder bottom, the annular chamber surrounding the butting ends of the floating plunger and of the plunger part which is partly embraced by the sleeve, and the annular chamber surrounding the central portion of the plunger part are formed by turning down the floating plunger and the plunger part, both the floating plunger and the plunger part being sealed against the cylinder wall and the inner wall of the sleeve which partly embraces the plunger part at the remaining collars.

9. An antiskid brake control system as defined in claim 6, characterized in that the sleeve is guided in a sealing manner in a part of the cylinder chamber which is widened by a step, and projects out of the cylinder opening.

10. An antiskid brake control system as defined in claim 9, characterized in that the sleeve lies on a spring retainer of a return spring unit which is mounted under pretension to the housing.

11. An antiskid brake control system as defined in claim 10, characterized in that on the bottom of the inner cylindric pot a stop is provided which limits the movement of the partition of the sleeve.

12. An antiskid brake control system as defined in claim 11, characterized in that the partition of the sleeve has a bore.

13. An antiskid brake control system as defined in claim 12, characterized in that at the step of the cylinder chamber an annular groove is provided which is connected through a pressure medium channel with the solenoid valve, locking or clearing the control pressure from the hydraulic energy source, and with the control channel of the separating valve in the brake circuit of one wheel.

14. An antiskid brake control system as defined in claim 13, characterized in that in rest position of the system the solenoid valve arranged in the return line is open and the solenoid valve arranged in the line from the hydraulic energy source is closed.

15. An antiskid brake control system as defined in claim 14, characterized in that the solenoid valves are to be excited by a signal current supplied from a deceleration sensor.

16. An antiskid brake control system as defined in claim 15, characterized in that a pin is tightly connected with the outer spring pot and the collar comes to rest on the bottom of the inner spring pot with the effect that the whole spring pot return spring unit is kept with pretension together.

17. The control system of claim 5 including a separating valve for isolating the section of the brake line connected to the wheel brake, a separating valve and the first plunger unit being connected by hydraulic control lines and the chambers communicating with each other and which can be alternately connected with the return line or a hydraulic source of energy, and the separating valve providing in its hollow space two valve bodies which are mechanically separated from each other and open and close in dependence on each other, and both valve bodies being pressure-balanced during rest position of the separating valve.

18. The control system of claim 17, wherein the separating valve is characterized in that one of the valve bodies is designed as a valve cone which is concentrically attached to a bolt, the latter being sealingly disposed in a control duct to be connected either with the return line or with the energy source, and said valve cone resting by its annular surface on the bottom of the valve hollow space during rest position of the separating valve.

19. The control system of claim 18, wherein the separating valve is characterized in that the second valve body is designed as a hollow cylinder which is guided on the bolt provided with axial recesses, said bolt extending beyond the tapered end of the valve cone, and the inner edge of the valve body towards the valve cone serving as a seat for the valve cone, whereas the surface of the valve body on the other side of the valve cone also provides a chamber and abuts the valve seat, the latter being formed by the edge of a recess provided on a cylindrical body which is inserted into the hollow space and sealed against the wall, said cylindrical body providing a center bore in which the bolt is also sealingly guided.

20. The control system of claim 19, wherein the separating valve is characterized in that the valve cone is lifted from its seat during rest position of the separating valve.

21. The control system of claim 20, wherein the separating valve is characterized in that the cylindrical body rests on the annular surface of a step provided in the hollow space.

22. The control system of claim 21, wherein the separating valve is characterized in that the face of the cylindrical valve body remote from the valve cone rests against an abutment and is lifted from its seat during rest position of the separating valve, said abutment being provided on the bolt.

23. The control system of claim 22, wherein the separating valve is characterized in that the pressure medium duct which communicates with the master cylinder extends into the portion of the hollow space with the smaller diameter due to the step, said portion accommodating the two valve bodies.

24. The control system of claim 23, wherein the separating valve is characterized in that a closure member is screwed into the hollow space against the cylindrical body, said closure member providing a blind bore in alignment with the bolt, and a spring resting against the bottom of said bore while the other end of the spring rests against the face of the bolt.

25. The control system of claim 24, wherein the separating valve is characterized in that the spring is dimensioned such that its force overcomes the frictional resistance of the bolt guides, particularly of the sealing rings provided between the bolt and the guide wall.

* * * * *